(12) United States Patent
Seubold

(10) Patent No.: US 11,701,745 B2
(45) Date of Patent: Jul. 18, 2023

(54) LOADING DEVICE FOR A PLUNGE CUT GRINDING MACHINE FOR CENTERLESS EXTERNAL CYLINDRICAL GRINDING AND METHOD FOR CENTERLESS EXTERNAL CYLINDRICAL GRINDING

(71) Applicant: Schaeffler Technologies AG & Co. KG, Herzogenaurach (DE)

(72) Inventor: Daniel Seubold, Marktgraitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 889 days.

(21) Appl. No.: 16/476,314

(22) PCT Filed: Feb. 27, 2018

(86) PCT No.: PCT/DE2018/100171
§ 371 (c)(1),
(2) Date: Jul. 8, 2019

(87) PCT Pub. No.: WO2018/162002
PCT Pub. Date: Sep. 13, 2018

(65) Prior Publication Data
US 2021/0283735 A1 Sep. 16, 2021

(30) Foreign Application Priority Data
Mar. 8, 2017 (DE) ...................... 10 2017 104 807.3

(51) Int. Cl.
*B23Q 7/00* (2006.01)
*B23Q 7/06* (2006.01)
(Continued)

(52) U.S. Cl.
CPC ............... *B23Q 7/006* (2013.01); *B23Q 7/06* (2013.01); *B24B 5/18* (2013.01); *B24B 5/355* (2013.01)

(58) Field of Classification Search
CPC ........... B24B 5/355; B24B 5/225; B24B 5/18; B24B 5/035; B24B 5/307; B24B 41/005;
(Continued)

(56) References Cited

U.S. PATENT DOCUMENTS 1,733,093 A * 10/1929 Booth .................... B24B 5/355
451/244
1,851,265 A   3/1932 Strickland et al.
2,720,734 A * 10/1955 Heckethorn ........... B24B 5/355
451/244

FOREIGN PATENT DOCUMENTS

CN   102240931 A   11/2011
CN   204748217 U   11/2015
(Continued)

OTHER PUBLICATIONS

DE 735510C Machine Translation (Year: 1943).*

*Primary Examiner* — Joel D Crandall
*Assistant Examiner* — Makena S Markman

(57) ABSTRACT

A loading device for a plunge-cut grinding machine for centerless external cylindrical grinding includes a receiving frame, a support body, and a displacement actuator. The receiving frame is open in a gravitational direction and is for receiving a blank workpiece to be machined. The support body forms a support base for the blank workpiece. The displacement actuator is for axially displacing the receiving frame relative to the support body and into a grinding gap of the plunge-cut grinding machine. The receiving frame includes a conveying stop on an axially facing end face. The conveying stop is for axially expelling a final workpiece arranged in the grinding gap.

13 Claims, 4 Drawing Sheets

(51) Int. Cl.
*B24B 5/18* (2006.01)
*B24B 5/35* (2006.01)

(58) Field of Classification Search
CPC . B23Q 7/06; B23Q 7/10; B23Q 7/008; B23Q 7/003; B23Q 7/006; B23Q 7/047
USPC ....... 451/241, 244, 245, 333, 334, 335, 337, 451/339
See application file for complete search history.

(56) References Cited

FOREIGN PATENT DOCUMENTS

| | | | | | |
|---|---|---|---|---|---|
| CN | 105364174 | A | | 3/2016 | |
| CN | 205237729 | U | | 5/2016 | |
| DE | 735510 | C | * | 5/1943 | ............. B24B 5/355 |
| DE | 735510 | C | | 5/1943 | |
| DE | 154886 | A1 | | 4/1982 | |
| DE | 3320062 | A1 | | 12/1984 | |
| DE | 2826209 | A1 | | 3/1997 | |
| DE | 10316956 | B4 | | 4/2008 | |
| JP | S45032225 | Y | | 12/1970 | |
| JP | H02269538 | A | | 11/1990 | |
| JP | H10202488 | A | | 8/1998 | |
| JP | 2000246582 | A | | 9/2000 | |
| SU | 1159759 | A1 | | 6/1985 | |

* cited by examiner

LOADING DEVICE FOR A PLUNGE CUT GRINDING MACHINE FOR CENTERLESS EXTERNAL CYLINDRICAL GRINDING AND METHOD FOR CENTERLESS EXTERNAL CYLINDRICAL GRINDING

CROSS-REFERENCE TO RELATED APPLICATIONS

This application is the United States National Phase of PCT Appln. No. PCT/DE2018/100171 filed Feb. 27, 2018, which claims priority to German Application No. DE102017104807.3 filed Mar. 8, 2017, the entire disclosures of which are incorporated by reference herein.

TECHNICAL FIELD

The disclosure relates to a loading device for a plunge-cut grinding machine for centerless external cylindrical grinding and to a method for centerless external cylindrical grinding, by means of which a blank workpiece can be machined by centerless external cylindrical grinding with geometrically undefined cutting edge to form a final workpiece.

BACKGROUND

In centerless external cylindrical grinding by means of a plunge-cut grinding machine, a blank workpiece to be ground is inserted into a grinding gap between a grinding disk and a regulating wheel, which respectively have a negative profile of the workpiece to be produced, by means of a gripper acting in the radial direction. The blank workpiece can herein be placed on a holding rail. Following the grinding, the gripper can grip the finished final workpiece, remove it from the grinding gap, deposit it at a location intended for this purpose, and grip the next blank workpiece to be ground and insert it into the grinding gap. It is also possible to push the final workpiece out of the grinding gap by means of an ejector acting in the axial direction on the final workpiece.

SUMMARY

According to the disclosure, a loading device for a plunge-cut grinding machine for centerless external cylindrical grinding is provided, comprising a receiving frame for receiving a blank workpiece to be machined, a support body for the formation of a support base for the blank workpiece received in the receiving frame, and a displacement actuator, acting on the receiving frame, for the axial displacement of the receiving frame relative to the support body into a grinding gap of the plunge-cut grinding machine. The receiving frame is designed open in the gravitational direction, is positioned offset from the support body, and has, on an end face facing in the axial direction, a conveying stop for the axial expulsion of a final workpiece arranged in the grinding gap.

The receiving frame can be constructed as a bottomless and lidless box, which can surround the blank workpiece inserted in the receiving frame. The blank workpiece can be transported from above into the receiving frame, wherein a gravity-induced falling of the blank workpiece out of the receiving frame can be blocked by the support body in the starting position of the receiving frame. The support body forms the support base for the blank workpiece inserted in the receiving frame. By means of the displacement actuator, the receiving frame can be axially displaced relative to the support body in the direction of the grinding gap. The receiving frame can hereupon butt with the conveying stop against the finished final workpiece in the grinding gap and thereby transport the final workpiece out of the grinding gap.

Once the receiving frame has arrived substantially fully in the region of the grinding gap, the blank workpiece can, where necessary, fall by force of gravity out of the receiving frame into the grinding gap. Once the blank workpiece is positioned in the grinding gap, the receiving frame can be moved back onto the support body into the previous starting position. By suitable measures, it can herein be ensured that the receiving frame, in the return motion, does not remain stuck with the conveying stop on the blank workpiece and jam. While the blank workpiece in the grinding gap is being machined by centerless external cylindrical grinding with a geometrically undefined cutting edge to form the final workpiece, the next blank workpiece can already be transported into the receiving frame.

The axial to-and-fro motion of the receiving frame can be realized very easily and effected particularly rapidly, so that the insertion of the next blank workpiece can be effected in a cost-effective and rapid manner. Moreover, the expulsion of the final workpiece and the insertion of the next blank workpiece can take place simultaneously, so that sequentially following action steps for the expulsion of the final workpiece and the insertion of the next blank workpiece are unnecessary. The workpiece changeover time can thereby be considerably reduced.

Moreover, the next blank workpiece can also already be prepared while the machining of the blank workpiece inserted in the grinding gap to form the final workpiece is still underway. As a result, the workpiece changeover time can likewise be reduced without a further independent handling tool being necessary for this purpose. For example, the receiving frame is provided with just one handling tool, which simultaneously inserts a further blank workpiece into the grinding gap and expels the finished final workpiece from the grinding gap. By virtue of the receiving frame, which is designed both for the expulsion of the final workpiece and the insertion of the blank workpiece, the workpiece changeover time can be reduced, so that a high quantity of workpieces producible by means of a plunge-cut grinding machine is enabled.

The displacement actuator can have, for instance, a piston guided in a cylinder, which piston is fastened, in particular, to that end face of the receiving frame that is facing away from the grinding gap. In an example embodiment, the displacement actuator can push the receiving frame away from it and pull this same toward it, so that both axial motions of the receiving frame can be executed by the displacement actuator. At that end face that is facing away from the grinding gap, the receiving frame can act on the blank workpiece in order to push the blank workpiece into the grinding gap.

The receiving frame can herein have side walls running substantially parallel to the axial direction, in order to prevent tilting of the blank workpiece transversely to the axial direction. Alternatively, the side walls can be formed by the support body, between which side walls an axial side wall of the receiving frame can be guided in order to axially displace the blank workpiece. The receiving frame can have on the side facing toward the grinding gap an edge and/or an end face, in order to form the conveying stop buttable against the final workpiece. In the axial return motion of the receiving frame, it can be provided that the conveying stop is led above and past the blank workpiece inserted in the grinding gap. It is herein possible to raise the entire receiving frame, or to move only the component forming the conveying stop above and past the blank workpiece inserted in the grinding gap.

The component forming the conveying stop can herein be movably connected to the receiving frame. In the axial motion of the blank workpiece into the grinding gap, the receiving frame or the support body can have a vertical height level at which the blank workpiece is positioned substantially coaxially to the final workpiece. In an example embodiment, the receiving frame or the support body has a vertical height level at which the blank workpiece is positioned so far above relative to the final workpiece that the receiving frame, without a radial relative motion of a grinding disk and/or of a regulating wheel of the plunge-cut grinding machine, can reach without bumping in between the grinding disk and the regulating wheel in the grinding gap. The blank workpiece can herein fall a small height out of the receiving frame at the designated place in the grinding gap. The fall height is herein so low that a damaging of the blank workpiece and/or of the plunge-cut grinding machine, or an incorrect positioning of the blank workpiece in the grinding gap, is not to be feared.

In an example embodiment, the support body has an end-face axial stop, facing toward the grinding gap, for the axial positioning of the blank workpiece inserted in the grinding gap. Once the blank workpiece is inserted in the grinding gap, the blank workpiece can be moved in the axial direction toward the axial stop of the support body. A precisely defined axial relative position of the blank workpiece in the grinding gap is thereby obtained. An axial projection of the blank workpiece beyond the region of the grinding disk can thereby be avoided, or at least minimized. A cutting-off of an axial projection on the final workpiece can thereby be avoided. As a result, the workpiece material usage can be kept low. In an example embodiment, an existing component can be used for the axial stop so that the number of components can be kept small.

In an example embodiment, the receiving frame has a positioning stop for axial abutment against that axial side of the blank workpiece that is facing away from the support body. As a result, the receiving frame, in the return motion into the starting position, can butt with the positioning stop against an axial side of the blank workpiece, for example, once the blank workpiece is inserted in the grinding gap for machining, and move into a defined axial relative position. In an example embodiment, the positioning stop can push the blank workpiece against the axial stop of the support body. In an example embodiment, an existing component can be used for the positioning stop so that the number of components can be kept low.

In an example embodiment, the receiving frame has, on an axial side facing toward the grinding gap, a spring-loaded flap, wherein the flap has, on the side facing away from the grinding gap, the positioning stop. If a sufficiently large resistance force is impressed on the positioning stop, for instance because the blank workpiece butts against the support body, the flap, together with the positioning stop, can yield, by virtue of a pivot motion, and be guided past the blank workpiece. The flap may be biased with a spring force, for instance by means of a leg spring, so that the flap can displace the blank workpiece without pivoting away and only executes a pivot motion once the blank workpiece, in the desired axial relative position of the blank workpiece, provides a correspondingly higher resistance force.

In particular, the flap, in the gravitational direction above the blank workpiece arranged in the grinding gap and/or on the upper portion of the receiving frame, is attached pivotably about a substantially perpendicular to an axial axis of the blank workpiece. The flap can thereby protrude far enough downward to be able to butt axially with the positioning stop against the blank workpiece, yet, at the same time, is attached so high up that the flap, in the desired axial relative position of the blank workpiece, can pivot away and be moved past the blank workpiece.

In an example embodiment, the flap, on the side facing toward the grinding gap, forms the conveying stop, wherein, in particular, the flap, on the side facing away from the grinding gap, is buttable against the rest of the receiving frame. A space-saving structure is thereby obtained, in order, on the one hand, to transport the final workpiece away and to insert the blank workpiece. For example, the flap, when butting against the final workpiece, can be pushed against a side edge of side walls of the receiving frame, thereby producing a stiffening which easily enables the final workpiece to be conveyed out of the grinding gap. In an example embodiment, the final workpiece can have an irregular outer contour, having steps, shoulders and depressions, so that, even in the event of significant resistance forces against an axial displacement of the final workpiece, the conveying stop of the flap can transport the final workpiece out of the grinding gap.

The disclosure further relates to a plunge-cut grinding machine for centerless external cylindrical grinding, comprising a grinding disk, a regulating wheel radially spaced apart from the grinding disk via a grinding gap, and a loading device, which can be configured and refined as described above, for loading a blank workpiece into the grinding gap and for, in particular simultaneously, removing a final workpiece from the grinding gap. By virtue of the receiving frame designed both for the expulsion of the final workpiece and the insertion of the blank workpiece, the workpiece changeover time can be considerably reduced, so that a high quantity of workpieces producible by means of a plunge-cut grinding machine is enabled.

In an example embodiment, in an axial direction facing away from the support body of the loading device, a conveying element adjoins the grinding gap, wherein, in particular, the conveying element is designed, for a gravity-assisted conveyance of the final workpiece away from the grinding gap, in particular in the shape of a ramp. For instance, the final workpiece can slide down on the conveying element designed as a ramp. It is also possible to design the conveying element as a conveyor belt or similar in order to move the final workpiece away from the plunge-cut grinding machine and create space for the next final workpiece.

The disclosure further relates to a method for centerless external cylindrical grinding, in particular by means of a plunge-cut grinding machine which can be configured and refined as described above. Per the method, a blank workpiece is inserted into a receiving frame of a loading device, which latter can be configured and refined as described above, and deposited on the support body. The receiving frame is moved in the axial direction down from the support body, wherein the receiving frame, during the axial motion, conveys a final workpiece, positioned in a grinding gap of a plunge-cut grinding machine, axially out of the grinding gap. The blank workpiece inserted in the receiving frame makes its way by force of gravity into the grinding gap and the receiving frame is moved in the axial direction back onto the support body. A further blank workpiece is inserted into the receiving frame and deposited on the support body while the blank workpiece positioned in the grinding gap is machined to produce the final workpiece. The method can be configured and refined as described above with reference to the loading device and/or the plunge-cut grinding machine. By virtue of the receiving frame designed both for the expulsion of the final workpiece and the insertion of the blank workpiece, the workpiece changeover time can be reduced, so that a high quantity of workpieces producible by means of a plunge-cut grinding machine is enabled.

In an example embodiment, it is provided that, during the axial return motion of the receiving frame onto the support body, the receiving frame axially pushes the blank workpiece inserted in the grinding gap axially up against the support body. This produces a defined axial relative position of the blank workpiece in the grinding gap. An axial projection of the blank workpiece beyond the region of the grinding disk can thereby be avoided, or at least minimized. As a result, a cutting-off of an axial projection on the final workpiece can be avoided. The workpiece material usage can hence be kept low. In an example embodiment, an existing component can be used for the axial stop, so that the number of components can be kept low.

BRIEF DESCRIPTION OF THE DRAWINGS

Below, the disclosure is explained by way of example with reference to the accompanying drawings on the basis of example illustrative embodiments. The features which are represented below can constitute, both respectively individually and in combination, an aspect of the disclosure, wherein.

DETAILED DESCRIPTION

Figure 1:
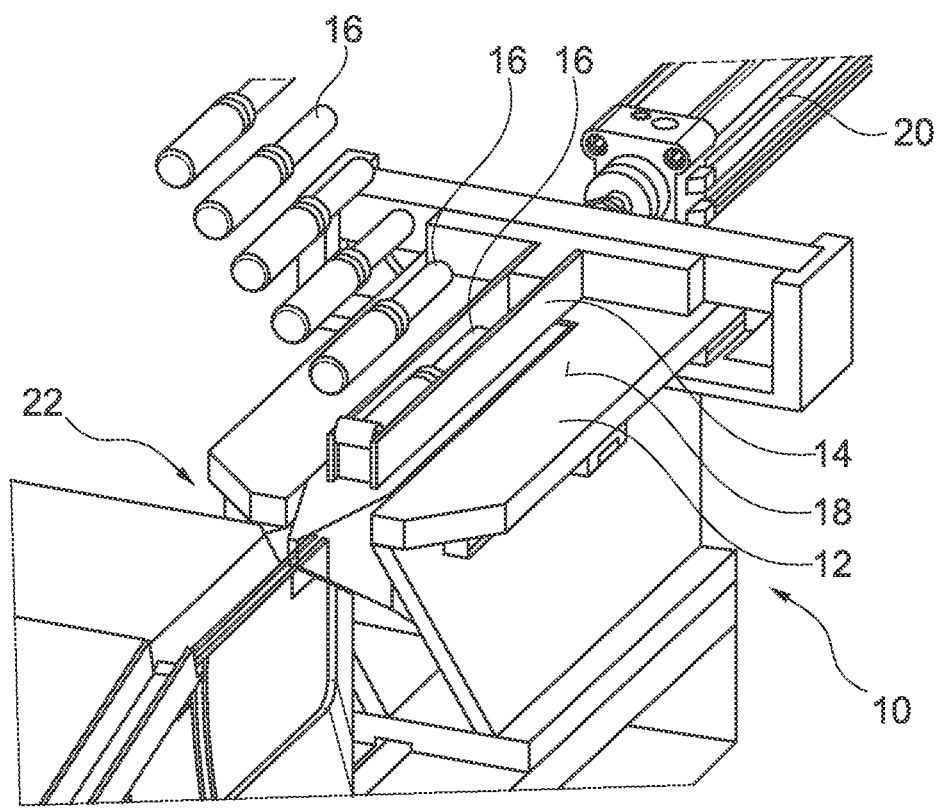
FIG. 1 shows a schematic perspective view of a loading device for a plunge-cut grinding machine.

The loading device 10 for a plunge-cut grinding machine, as represented in FIG. 1, has a support body 12, on which a receiving frame 14 is deposited. In the represented starting position of the receiving frame 14, a blank workpiece 16 to be ground can be inserted into the receiving frame 14, for instance, by means of a singulating device laden with a plurality of blank workpieces 16. The blank workpiece 16 can be placed in the downwardly and upwardly open receiving frame 14 on an upward facing support base 18 of the support body 12. To the receiving frame 14 is fixedly connected a displacement actuator 20 designed as, for instance, a hydraulically operated piston/cylinder unit, which displacement actuator can move the receiving frame 14 parallel to the support base 18, in the axial direction, into a grinding gap 22 between a profiled grinding disk (not represented for reasons of greater clarity) and a profiled regulating wheel (not represented) of the plunge-cut grinding machine, and back into the starting position.

Figure 2:
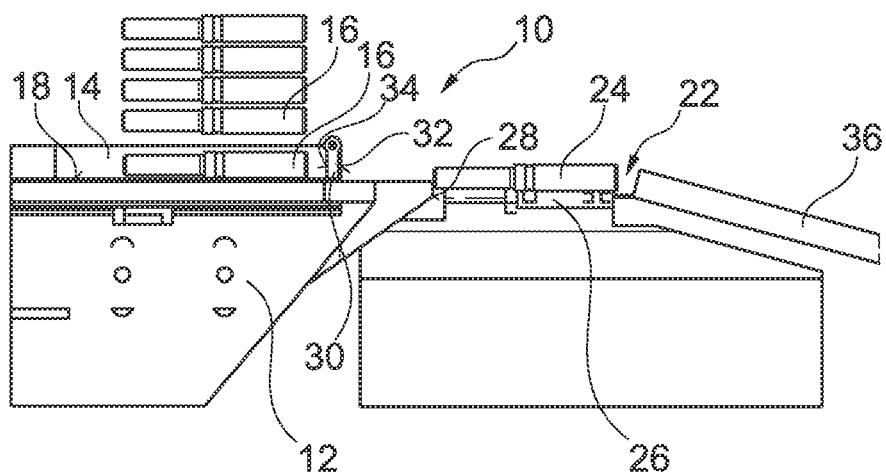
FIG. 2 shows a schematic sectional view of the loading device from FIG. 1 at a first point in time.

As represented in FIG. 2, at the point in time at which the blank workpiece 16 is inserted into the receiving frame 14, a final workpiece 24 can be produced in the grinding gap 22 of the plunge-cut grinding machine. The final workpiece 24 can be positioned in a vertically defined manner on a holding rail 26. Moreover, the final workpiece 24 can bear against an axial stop 28 of the support body 12, so that also the axial relative position in the grinding gap 22 can be preset in a defined manner. On that end face of the receiving frame 14 which is facing toward the grinding gap 22, a flap 30 is attached to the upper end of the receiving frame 14, which flap, in the represented closed state, is biased, in particular by means of a spring. On the side facing toward the grinding gap 22, the flap 30 forms a conveying stop 32, and on the opposite side facing away from the grinding gap 22, a positioning stop 34.

Figure 3:
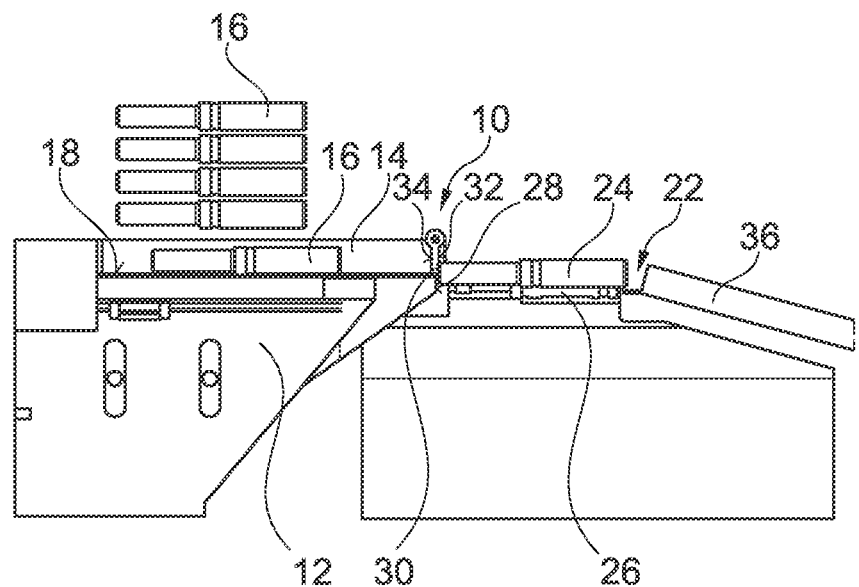
FIG. 3 shows a schematic sectional view of the loading device from FIG. 1 at a second point in time.
Figure 4:
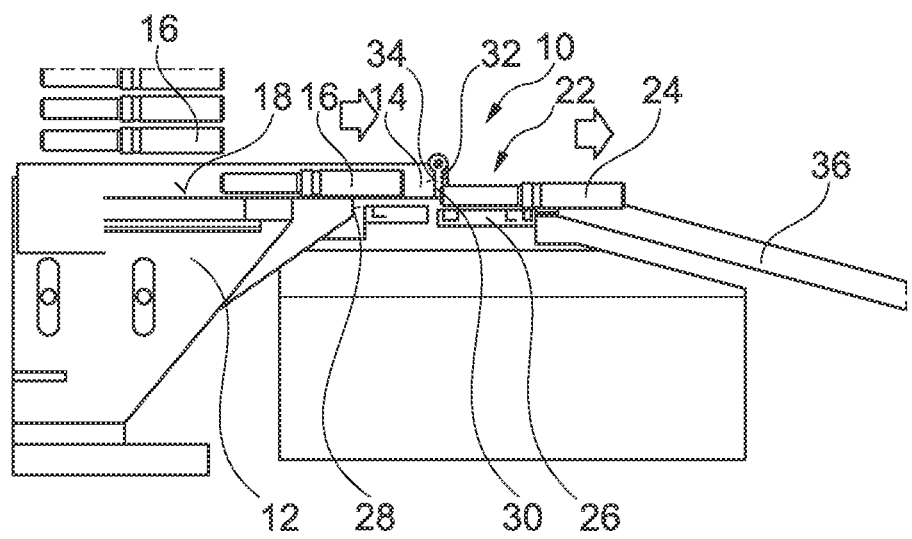
FIG. 4 shows a schematic sectional view of the loading device from FIG. 1 at a third point in time.
Figure 5:
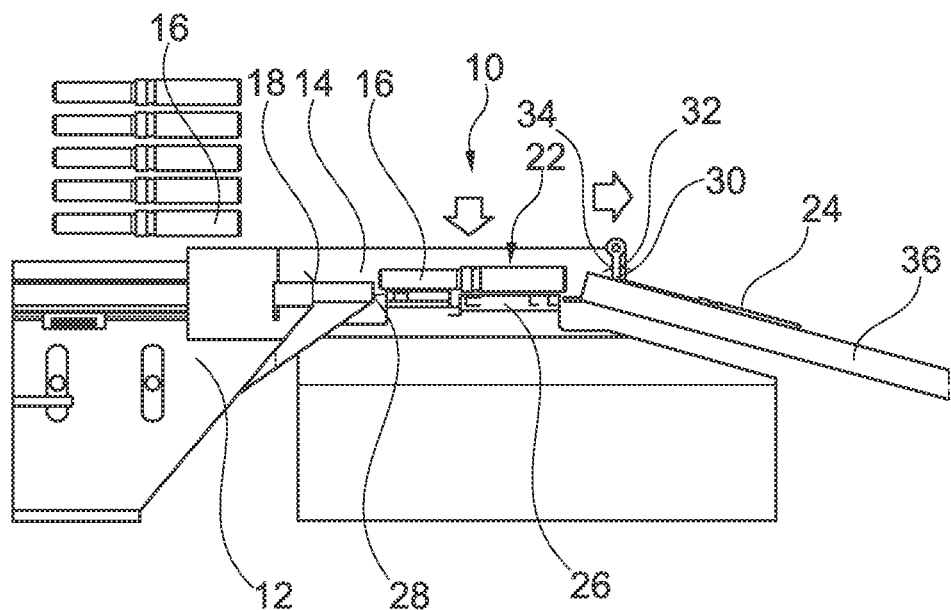
FIG. 5 shows a schematic sectional view of the loading device from FIG. 1 at a fourth point in time.

As represented in FIG. 3, the receiving frame 14 can butt with the conveying stop 32 of the flap 30 axially against the upper part of the final workpiece 24 when the displacement actuator 20 draws out the receiving frame 14 in the direction of the grinding gap 22. The final workpiece 24 can thereby be pushed away from the axial stop 28 of the support body 12 and be conveyed into an axially opposing conveying element 36, designed, for instance, as a ramp, as represented in FIG. 4. When the receiving frame 14 has reached its end position provided in grinding gap 22, as represented in FIG. 5, the final workpiece 24 has fully emerged from the grinding gap 22. The blank workpiece 16 can fall downward out of the receiving frame 14 and be received within the grinding gap 22 by the holding rail 26.

Figure 6:
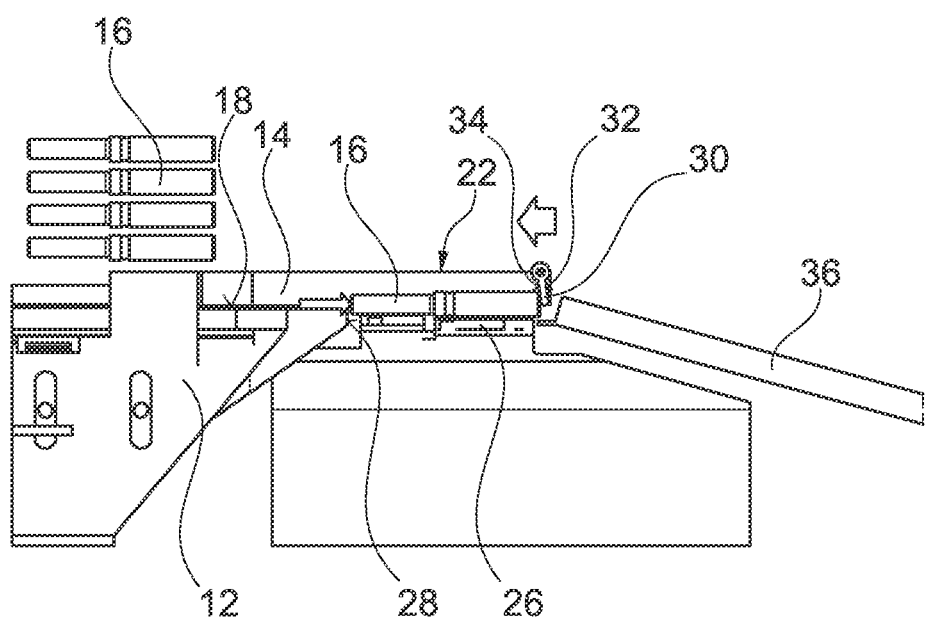
FIG. 6 shows a schematic sectional view of the loading device from FIG. 1 at a fifth point in time.
Figure 7:
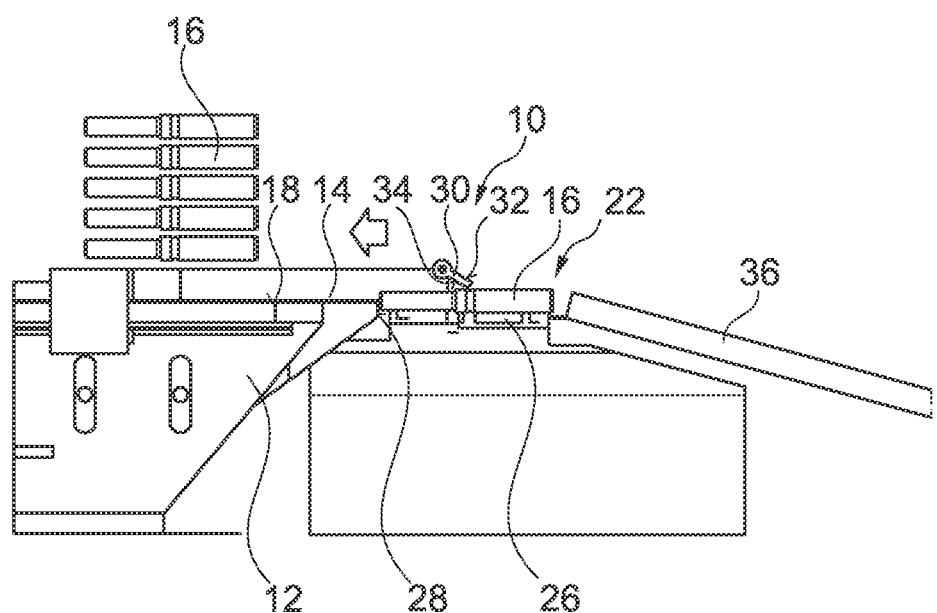
FIG. 7 shows a schematic sectional view of the loading device from FIG. 1 at a sixth point in time.
Figure 8:
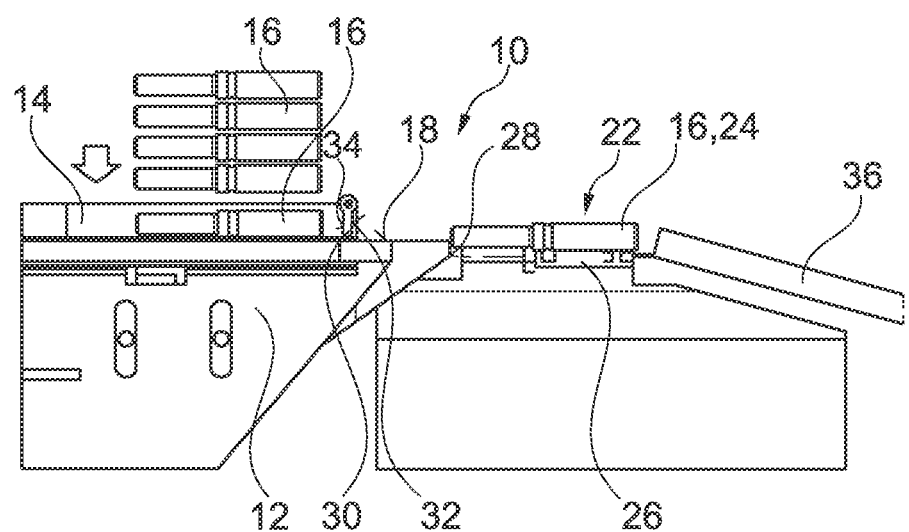
FIG. 8 shows a schematic sectional view of the loading device from FIG. 1 at a seventh point in time.

When the receiving frame 14 is moved back into the starting position, as represented in FIG. 6, the positioning stop 34 of the spring-loaded flap 30 can butt against the blank workpiece 16 and push the blank workpiece 16 against the axial stop 28 of the support body 12. Upon a further axial motion of the receiving frame 14, as represented in FIG. 7, the flap 30 can fold away, so that the flap 30 and the positioning stop 34 can be guided past the positioned blank workpiece 16 without having to raise the entire receiving frame 14 for this purpose. Finally, the receiving frame again reaches the starting position represented in FIG. 8 and can be loaded with a further blank workpiece 16, while the blank workpiece 16 positioned in the grinding gap 22 can be made into the final workpiece 24.

REFERENCE NUMERALS 10 loading device
12 support body
14 receiving frame
16 blank workpiece
18 support base
20 displacement actuator
22 grinding gap
24 final workpiece
26 holding rail
28 axial stop
30 flap
32 conveying stop
34 positioning stop
36 conveying element

The invention claimed is:
1. A loading device for a plunge-cut grinding machine for centerless external cylindrical grinding, comprising
a receiving frame, open in a gravitational direction, for receiving a blank workpiece to be machined;

a support body forming a support base for the blank workpiece; and a displacement actuator for axially displacing the receiving frame relative to the support body and into a grinding gap of the plunge-cut grinding machine, wherein:

the receiving frame comprises:
  a conveying stop on an axially facing end face;
  a positioning stop for axial abutment against an axial side of the blank workpiece that is facing away from the support body; and
  a flap on an axial side facing toward the grinding gap that comprises the positioning stop on an axial side facing away from the grinding gap; and
the conveying stop is for axially expelling a final workpiece arranged in the grinding gap.

2. The loading device of claim 1, wherein the support body comprises an end-face axial stop, facing toward the grinding gap, for axially positioning the blank workpiece in the grinding gap.

3. The loading device of claim 1, wherein the flap is attached:
  pivotably about an axis substantially perpendicular to an axial axis of the blank workpiece; and
  above the blank workpiece or above an upper margin portion of the receiving frame in the gravitational direction.

4. The loading device of claim 1, wherein the flap:
  forms the conveying stop on the axial side facing toward the grinding gap; and
  is buttable against the receiving frame on the axial side facing away from the grinding gap.

5. The loading device of claim 1 wherein the flap is spring-loaded.

6. The loading device of claim 1, wherein the receiving frame is configured for:
  loading the blank workpiece into the grinding gap; and
  simultaneously removing the final workpiece from the grinding gap.

7. The loading device of claim 6, wherein:
  a conveying element adjoins the grinding gap in an axial direction facing away from the support body; and
  the conveying element is designed as a ramp for a gravity-assisted conveyance of the final workpiece away from the grinding gap.

8. A method for centerless external cylindrical grinding comprising:
  providing the loading device of claim 6;
  inserting a first blank workpiece into the receiving frame and depositing the first blank workpiece on the support body;
  axially moving the receiving frame away from the support body;
  conveying a first final workpiece, positioned in the grinding gap of the plunge-cut grinding machine, axially and out of the grinding gap;
  depositing the first blank workpiece into the grinding gap by gravity;
  axially moving the receiving frame onto the support body; and
  inserting a second blank workpiece into the receiving frame and depositing the second blank workpiece on the support body while the first blank workpiece is machined to produce a second final workpiece.

9. The method of claim 8 further comprising axially pushing the first blank workpiece against the support body with the receiving frame during the step of axially moving the receiving frame onto the support body.

10. A loading device for a plunge-cut grinding machine for centerless external cylindrical grinding, comprising:
  a receiving frame, open in a gravitational direction, for receiving a blank workpiece to be machined;
  a support body forming a support base for the blank workpiece; and
  a displacement actuator for axially displacing the receiving frame relative to the support body and into a grinding gap of the plunge-cut grinding machine, wherein:
  the receiving frame comprises a conveying stop on an axially facing end face, the receiving frame is configured for:
    loading the blank workpiece into the grinding gap; and
    simultaneously removing a final workpiece from the grinding gap; and
  the conveying stop is for axially expelling the final workpiece arranged in the grinding gap.

11. The loading device of claim 10, wherein:
  a conveying element adjoins the grinding gap in an axial direction facing away from the support body; and
  the conveying element is designed as a ramp for a gravity-assisted conveyance of the final workpiece away from the grinding gap.

12. A method for centerless external cylindrical grinding comprising:
  providing a loading device having a receiving frame open in a gravitational direction;
  inserting a first blank workpiece into the receiving frame and depositing the first blank workpiece on a support body;
  axially moving, via a displacement actuator, the receiving frame away from the support body and into a grinding gap of a plunge-cut grinding machine;
  conveying a first final workpiece, positioned in the grinding gap of the plunge-cut grinding machine, axially and out of the grinding gap;
  depositing the first blank workpiece into the grinding gap by gravity;
  axially moving the receiving frame onto the support body; and
  inserting a further blank workpiece into the receiving frame and depositing the further blank workpiece on the support body while the first blank workpiece is machined to produce a further final workpiece;
  wherein the receiving frame includes a conveying stop on an axially facing end face, the conveying stop is configured for axially expelling the further final workpiece arranged in the grinding gap;
  wherein the receiving frame is configured for:
    loading the first blank workpiece into the grinding gap; and
    simultaneously removing the first final workpiece from the grinding gap;
    wherein the support body forms a support base for the first blank workpiece.

13. The method of claim 12, further comprising axially pushing the blank workpiece against the support body with the receiving frame during the step of axially moving the receiving frame onto the support body.

* * * * *